United States Patent
Prestrelski et al.

(10) Patent No.: US 12,514,907 B2
(45) Date of Patent: Jan. 6, 2026

(54) TREATMENT OF EXERCISE-INDUCED HYPOGLYCEMIA IN TYPE 1 AND INSULIN USING TYPE 2 DIABETES

(71) Applicant: Xeris Pharmaceuticals, Inc., Chicago, IL (US)

(72) Inventors: Steven Prestrelski, Chicago, IL (US); Brett Newswanger, Chicago, IL (US); Martin Cummins, Chicago, IL (US); Michael Riddell, Chicago, IL (US)

(73) Assignee: Xeris Pharmaceuticals, Inc., Chicago, IL (US)

( * ) Notice: Subject to any disclaimer, the term of this patent is extended or adjusted under 35 U.S.C. 154(b) by 159 days.

(21) Appl. No.: 18/357,666

(22) Filed: Jul. 24, 2023

(65) Prior Publication Data

US 2024/0016898 A1    Jan. 18, 2024

Related U.S. Application Data

(63) Continuation of application No. 16/955,698, filed as application No. PCT/US2018/067294 on Dec. 21, 2018, now abandoned.

(60) Provisional application No. 62/609,964, filed on Dec. 22, 2017.

(51) Int. Cl.
| | | |
|---|---|---|
| *A61K 38/26* | (2006.01) | |
| *A61K 9/00* | (2006.01) | |
| *A61K 47/02* | (2006.01) | |
| *A61K 47/10* | (2017.01) | |
| *A61K 47/26* | (2006.01) | |
| *A61P 3/10* | (2006.01) | |

(52) U.S. Cl.
CPC ........... *A61K 38/26* (2013.01); *A61K 9/0053* (2013.01); *A61K 47/02* (2013.01); *A61K 47/10* (2013.01); *A61K 47/26* (2013.01); *A61P 3/10* (2018.01)

(58) Field of Classification Search
CPC ........ A61K 38/26; A61K 47/20; A61K 9/107; A61K 9/0019
See application file for complete search history.

(56) References Cited

U.S. PATENT DOCUMENTS

| | | |
|---|---|---|
| 2012/0232001 A1 | 9/2012 | Prestrelski et al. |
| 2014/0221288 A1 | 8/2014 | Prestrelski et al. |
| 2014/0287998 A1 | 9/2014 | Rylander, Jr. et al. |
| 2017/0007675 A1* | 1/2017 | Prestrelski ............. A61K 47/02 |
| 2017/0202926 A1 | 7/2017 | Chen |

FOREIGN PATENT DOCUMENTS

| | | |
|---|---|---|
| CN | 103442695 A | 12/2013 |
| CN | 107106659 A | 8/2017 |
| JP | 2017505331 A | 2/2017 |
| WO | WO-2015120231 A2 * | 8/2015 ............. A61K 38/09 |
| WO | WO-2016196976 A1 | 12/2016 |
| WO | WO-2016201248 A1 | 12/2016 |
| WO | WO-2017053922 A1 | 3/2017 |
| WO | WO-2019126753 A1 | 6/2019 |

OTHER PUBLICATIONS

Brazeau, A-S., et al., "Barriers to physical activity among patients with type 1 diabetes," *Diabetes Care* 31(11):2108-2109, American Diabetes Association Inc., United States (2008).

Camacho, R.C., et al., "Glucoregulation during and after exercise in health and insulin-dependent diabetes," *Exercise and Sport Sciences Reviews* 33(1):17-23, Lippincott Williams and Wilkins Ltd., United States (2005).

Campbell, M.D., et al., "Large pre- and postexercise rapid-acting insulin reductions preserve glycemia and prevent early-but not late-onset hypoglycemia in patients with type 1 diabetes," *Diabetes Care* 36(8):2217-2245, American Diabetes Association Inc., United States (2013).

Campbell, M.D., et al., "Metabolic implications when employing heavy pre- and post-exercise rapid-acting insulin reductions to prevent hypoglycaemia in type 1 diabetes patients: a randomised clinical trial," *PLoS One* 9(5):e97143, Public Library of Science, United States (2014).

Chu, L., et al., "Clinical management of the physically active patient with type 1 diabetes," *Phys Sportsmed* 39(2):64-77, Taylor and Francis Ltd., United Kingdom (2011).

International Search Report and Written Opinion for International Application No. PCT/US2018/067294, European Patent Office, Netherlands, mailed on Mar. 26, 2019, 11 pages.

McCall, B., "Minidose Glucagon for Exercise-Induced Hypoglycemia in T1D," MedScape.com, published on Sep. 18, 2017, accessed at https://www.medscape.com/viewarticle/885795_print, accessed on Sep. 22, 2020, 2 pages.

Oskarsson, P.R., et al., "Metabolic and hormonal responses to exercise in type 1 diabetic patients during continuous subcutaneous, as compared to continuous intraperitoneal, insulin infusion," *Diabetes & Metabolism* 25(6):491-497, Elsevier Masson, France (1999).

Rabasa-Lhoret, R., et al., "Guidelines for premeal insulin dose reduction for postprandial exercise of different intensities and durations in type 1 diabetic subjects treated intensively with a basal-bolus insulin regimen (ultralente-lispro)," *Diabetes Care* 24(4):625-630, American Diabetes Association Inc., United States (2001).

(Continued)

*Primary Examiner* — Gyan Chandra
(74) *Attorney, Agent, or Firm* — STERNE, KESSLER, GOLDSTEIN & FOX P.L.L.C.

(57) ABSTRACT

Certain embodiments are directed to methods for treating, ameliorating, or preventing exercise-induced or exercise-associated hypoglycemia comprising administration to a subject in need thereof a formulation(s) of glucagon or glucagon analog in an amount effective to treat, ameliorate, or prevent the condition. The subject can be administered a glucagon or a glucagon analog composition 1, 5, 10, 15 to 20, 25, 30 minutes prior to initiation of exercise.

27 Claims, 5 Drawing Sheets

(56) References Cited

OTHER PUBLICATIONS

Ranjan, A., "Glucagon treatment in type 1 diabetes—with focus on restoring plasma glucose during mild hypoglycemia," *Danish Medical Journal* 65(2):B5449, Almindelige Danske Laegeforening, Denmark (2018).

Rickels, M.R., et al., "Mini-dose Glucagon as a Novel Approach to Prevent Exercise-Induced Hypoglycemia in Type 1 Diabetes," 77th *Scientific Sessions Late Breaking Abstracts* 66(Suppl. 1A): Abstract 67-LB, Jun. 9-13, 2017, American Diabetes Association, United States (2017).

Riddell, M.C., et al., "Glucose ingestion matched with total carbohydrate utilization attenuates hypoglycemia during exercise in adolescents with IDDM," *International Journal of Sport Nutrition and Exercise Metabolism* 9(1):24-34, Human Kinetics Publishers Inc., United States (1999).

Robertson, K., et al., "ISPAD Clinical Practice Consensus Guidelines 2014 Compendium. Exercise in children and adolescents with diabetes," *Pediatric Diabetes* 15(Suppl. 20):203-223, Blackwell Munksgaard, United Kingdom (2014).

Stenerson, M., et al., "The impact of accelerometer use in exercise-associated hypoglycemia prevention in type 1 diabetes," *Journal of Diabetes Science and Technology* 9(1):80-85, Diabetes Technology Society, United States (2015).

Taleb, N., et al., "Efficacy of single-hormone and dual-hormone artificial pancreas during continuous and interval exercise in adult patients with type 1 diabetes: randomised controlled crossover trial," *Diabetologia* 59(12):2561-2571, Springer Verlag, Germany (2016).

Tanenberg, R.J., et al., "Confirmation of hypoglycemia in the "dead-in-bed" syndrome, as captured by a retrospective continuous glucose monitoring system," *Endocrine Practice* 16(2):244-248, American Association of Clinical Endocrinology, United States (2010).

Taplin, C.E., et al., "Preventing post-exercise nocturnal hypoglycemia in children with type 1 diabetes," *Journal of Pediatrics* 157(5):784-788, Mosby Inc., United States (2010).

Tsalikian, E., et al., "Impact of exercise on overnight glycemic control in children with type 1 diabetes mellitus," *Journal of Pediatrics* 147(4):528-534, Mosby Inc., United States (2005).

West, D.J., et al., "Blood glucose responses to reductions in pre-exercise rapid-acting insulin for 24 h after running in individuals with type 1 diabetes," *Journal of Sports Sciences* 28(7):781-788, Routledge, United Kingdom (2010).

Haymond, M.W. et al., "Efficacy and Safety of Mini-Dose Glucagon for Treatment of Nonsevere Hypoglycemia in Adults With Type 1 Diabetes," *J Clin Endocrinol Metab* 102:2994-3001, Oxford University Press, United Kingdom (2017).

Liang, J., "Research Progress of the Relationship between Glucagon and Type 1 Diabetes," *Journal of Medical Postgraduates* 29:1004-1008, Nanjing General Hospital of Nanjing, China (2016).

* cited by examiner

TREATMENT OF EXERCISE-INDUCED HYPOGLYCEMIA IN TYPE 1 AND INSULIN USING TYPE 2 DIABETES

CROSS REFERENCE TO RELATED APPLICATIONS

This application is a continuation of U.S. application Ser. No. 16/955,698, § 371(c) date Jun. 18, 2020 (now abandoned), which is the U.S. National Stage Application of International Appl. No. PCT/US2018/067294, filed Dec. 21, 2018, which claims the benefit of U.S. Provisional Application No. 62/609,964, filed Dec. 22, 2017, the contents of which are incorporated by reference in their entireties.

BACKGROUND OF THE INVENTION

A. Field of the Invention

The invention generally concerns compositions and methods related to physiology and medicine. In particular the compositions and methods are related to treating a certain instance of hypoglycemia.

B. Description of Related Art

Exercise is at the cornerstone of type 1 diabetes (T1D) management (Chu et al., *Physiol Sports Med* 39:64-77, 2011). However, blood glucose stability during exercise, and for up to 12-24 hours in recovery, remains a major challenge (West et al., *J Sports Sci* 28:781-88, 2010). A fear of hypoglycemia deters many patients from engaging in aerobic exercise (Brazeau et al., *Diabetes Care.* 11:2108-9, 2008). For those who choose to exercise on a regular basis, hypoglycemia is a common complaint that often requires breaks in sports and competition, games, and training (Chu et al., *Physiol Sports Med* 39:64-77, 2011). To reduce the incidence of hypoglycemia during and immediately after exercise, patients are recommended to reduce their bolus dose at the meal preceding exercise by 25-75% (Chu et al., *Physiol Sports Med* 39:64-77, 2011); however, this approach frequently results in pre-exercise hyperglycemia, particularly if the exercise is performed 2 hours or more after the meal (West et al., *J Sports Sci* 28:781-88, 2010; Rabasa-Lhoret et al., *Diabetes Care* 24:625-30, 2001; Campbell et al., *Diabetes Care* 36:2217-45, 2013). Even exercise in the fasting state in patients on continuous subcutaneous insulin infusion (CSII) promotes a drop in glycemia if basal insulin levels are unadjusted (Stenerson et al., *J Diabetes Sci Technol.* PMID: 25231116, 2014).

Post-exercise nocturnal hypoglycemia is also very common in T1D, with roughly 50% of young patients developing the condition about 7 to 11 hours after the end of vigorous afternoon exercise (Tsalikian et al., *J Pediatr.* 4:528-34, 2005). If insulin administration occurs to correct post-exercise meal-related hyperglycemia (often called "rebound" hyperglycemia), severe post-exercise hypoglycemia can occur which may even result in death (Tanenberg et al., *Endocr Pract.* 16(2):244-8, 2010). Patients can reduce the dose of rapid-acting insulin administered with the dinner meal after late day exercise to reduce nocturnal hypoglycemia risk (Campbell et al., *PLoS One* 9(5):e97143, 2014) or lower basal insulin delivery for 6 hours at bedtime (Taplin et al., *J Pediatr* 157(5):784-8, 2010) to help mitigate risk, but these strategies often result in hyperglycemia (Campbell et al., *PLoS One* 9(5):e97143, 2014; Taplin et al., *J Pediatr* 157(5):784-8, 2010). Although extra carbohydrate ingestion not covered by insulin administration can help prevent hypoglycemia during and after exercise (Riddell et al., *Int J Sport Nutr.* 9(1):24-34, 1999), excessive intake defeats the ability of the patient to have a negative caloric balance, thereby limiting the capacity for patients to maintain or lose body weight.

Patients on insulin pump therapy have the flexibility to reduce basal insulin delivery in anticipation of exercise and in recovery to help guard against hypoglycemia. The International Society for Pediatric and Adolescent Diabetes guidelines recommend that basal insulin reductions should be done 60-90 minutes before the start of exercise so that circulating insulin levels are lowered by the start of the activity (Robertson et al., *Pediatr Diabetes.* 15 Suppl 20:203-23, 2014). This is a somewhat cumbersome and unpredictable task that is usually not performed correctly, even by the most educated and motivated patients. Since glucose production by the liver during moderate intensity exercise is primarily facilitated by a rise in the glucagon to insulin ratio (Camacho et al., *Exerc Sport Sci Rev.* 33(1):17-23, 2005) and patients with T1D have a reduction in this ratio during exercise because of a relative peripheral hyperinsulinemia (Camacho et al., *Exerc Sport Sci Rev.* 33(1):17-23, 2005) and impaired glucagon secretion (Oskarsson et al., *Diabetes Metab.* 25(6):491-497, 1999), it may be better to attempt to change this ratio by the administration of glucagon at the onset of exercise.

SUMMARY OF THE INVENTION

Compositions and methods of the current invention provide a solution to the glycemic control problems associated with exercise in diabetic subjects. In particular, glucagon or a glucagon analog are administered prior; during; after; prior and during; prior and after; or prior, during and after exercise. In certain aspects, glucagon or a glucagon analog is administered prior to exercise and optionally during exercise. By way of example, the inventors have discovered a process to treat, ameliorate, or prevent exercise induced hypoglycemia while avoiding hyperglycemia.

Certain embodiments are directed to methods for treating, ameliorating, or preventing an exercise-induced or exercise associated hypoglycemia comprising administering to a subject in need thereof a formulation(s) of glucagon or glucagon analog (e.g., dasiglucagon) in an amount effective to treat, ameliorate, or prevent the condition. The subject can be administered a glucagon or a glucagon analog composition 1, 5, 10, 15 to 20, 25, 30 minutes, including all values and ranges there between, prior to initiation of exercise. In certain aspects the subject is a diabetic subject. In a further aspect, 25, 50, 75, 100, 125, 150, 175, 200, 225, 250, 275, to 300 µg of glucagon or glucagon analog are administered, in certain aspects 150±50 µg. The glucagon or glucagon analog can be administered as a bolus or as an infusion over 5 to 30 minutes. In certain aspects a second dose of glucagon or glucagon analog is administered during exercise. The second dose can be a dose of 25, 50, 75, 100, 125, 150, 175, 200, 225, 250, 275, to 300 µg of glucagon or glucagon analog are administered, in certain aspects 150±50 µg. The second dose can be administered during exercise or activity having a duration of more than 30, 40, 50, 60, 70, 80, 90, 100, 110, 120, 130, 140, 150, 160, 170, 180, 190, 200, 250, 300, to 400 minutes or more. The second dose can be administered 10, 15, 20, 25, 30, 40, 50, 60, 70, 80, 90, 100, 110, 120, 130, 140, 150, 160, 170, 180, 190, 200, 250, 300, to 400 minutes or more after the exercise or activity has started. In other aspects, independently of or in conjunction with exercise duration, the second dose can be administered when a certain exercise or activity intensity has been reached. In certain aspects a second dose is administered after an exercise intensity of 60, 65, 70, 75, 80, 85% of the maximum heart rate or more, or a MET of 1.5, 2, 2.5, 3, 3.5, 4 or more has been achieved for 0.5, 1, 10, 20, 30, 40, 50, 60, 70 minutes or more in duration. In certain aspects 1, 2, 3, 4, or more doses can be administered during exercise.

In certain aspects a first, second, or third dose of glucagon or glucagon analog is administered after exercise. The dose can be a dose of 25, 50, 75, 100, 125, 150, 175, 200, 225, 250, 275, to 300 µg of glucagon or glucagon analog that is administered 5, 10, 20, 30, 40, 50, 60, 70, 80, 90, 100, 110, 120, 130, 140, 150, 160, 170, 180, 190, 200, to 250 minutes after exercise is complete. In certain aspects glucagon or glucagon analog can be administered before, during and after exercise. In certain aspects 1, 2, 3, 4, or more doses can be administered during and/or after exercise.

A variety of methods can be employed to determine exercise or activity intensity. The term exercise or activity intensity refers to an amount of exercise or activity at an exercise or activity level, for example, a number of repetitions of an exercise or a duration of the exercise or activity. One method of determining exercise or activity intensity uses percentages of an exerciser's maximum heart. The exerciser's maximum heart rate can be calculated based on the exerciser's age, such as by subtracting the exerciser's age from 220. The exerciser then exercises at various intensity levels so that his or her heart rate is equal to certain percentages (e.g., between 60-85%) of the exerciser's maximum heart rate. In another example, exercise intensity can be represented by exercise intensity based on the Karvonen Formula or as represented by exercise intensity such as metabolic equivalents (METs), which is an oxygen consumption amount, and a Borg scale (subjective exercise intensity). The exercise intensity (METs) is a scale representing the oxygen consumption in the body during or immediately after an exercise caused by training or the like. More specifically, the exercise intensity (METs) represents how much larger the current oxygen consumption is compared to oxygen consumption measured in a resting condition (METs=1) (condition in which a user is kept quiet on a chair for several minutes, condition in which the user is in good physical health, and condition in which the user feels relaxed). For example, in the case where the current oxygen consumption is double the oxygen consumption measured in a resting condition, 2 is obtained as the exercise intensity (METs).

A suitable dosage of glucagon or glucagon analog may be administered in the methods of the present invention. The dosage administered will, of course, vary depending upon known factors, such as the pharmacodynamic characteristics of the particular compound, salt, or combination; the age, health, or weight of the subject; the nature and extent of symptoms; the metabolic characteristics of the drug and patient, the kind of concurrent treatment; the frequency of treatment; or the effect desired. In certain aspects hypoglycemia can be treated by administering a formulation described herein comprising an effective amount of glucagon.

The glucagon formulations, such as stable formulations described herein, can be used for the parenteral injection of glucagon or a glucagon analog. In certain aspects a formulation is provided as an injectable formulation. The injectable formulation can be administered into the epidermal, dermal, or subcutaneous layer of an animal or subject. In certain aspects the formulations are administered intracutaneously. In certain aspects glucagon formulations can be administered intravenously, intranasally, transdermally or via inhalation. In certain aspects a glucagon analog is a glucagon peptidomimetic.

Certain embodiments utilize a formulation of glucagon or a glucagon analog comprising a glucagon or a glucagon analog at a concentration of at least, at most, or about 0.1, 1, 10, 50, or 100 mg/mL to 150, 200, 300, 400, or 500 mg/ml, or up to the solubility limit of the glucagon or a glucagon analog. In certain aspects the glucagon or glucagon analog are in an aprotic polar solvent system. In certain aspects the aprotic polar solvent system comprises a concentration of at least one ionization stabilizing excipient that provides physical and chemical stability to the therapeutic agent. Certain formulations can comprise an ionization stabilizing excipient at a concentration of at least, at most, or about 0.01, 0.1, 0.5, 1, 10, or 50 mM to 10, 50, 75, 100, 500, 1000 mM, or up to the solubility limit of the ionization stabilizing excipient in the aprotic polar solvent system. In certain aspects the ionization stabilizing excipient concentration is between 0.1 mM to 100 mM. The ionization stabilizing excipient can be a suitable mineral acid, such as hydrochloric acid or sulfuric acid. In certain aspects the ionization stabilizing excipient may be an organic acid, such as an amino acid, amino acid derivative, or the salt of an amino acid or amino acid derivative (examples include glycine, trimethylglycine (betaine), glycine hydrochloride, and trimethylglycine (betaine) hydrochloride). In a further aspect the amino acid can be glycine or the amino acid derivative trimethylglycine. In further aspects the aprotic solvent system comprises DMSO. The aprotic solvent can be deoxygenated, e.g., deoxygenated DMSO.

In certain embodiments certain formulations can be prepared by first adding the ionization stabilizing excipient to the aprotic polar solvent system, followed by addition of the glucagon or glucagon analog. Alternatively, the glucagon or glucagon analog may initially be solubilized in the aprotic polar solvent system followed by addition of the ionization stabilizing excipient. In a further aspect, the ionization stabilizing excipient and the glucagon or glucagon analog may be solubilized simultaneously in the aprotic polar solvent system. In certain aspects the therapeutic agent is glucagon or a salt thereof. Other formulations can be prepared using other methods known in the art.

Definitions

The term "glucagon" refers to the glucagon peptide, analogues thereof, and salt forms of either thereof.

A peptide's "optimal stability and solubility" refers to the pH environment wherein solubility of the peptide is high (at or near the maximum on a solubility versus pH profile, or suitable for the requirements of the product) and its degradation minimized relative to other pH environments. Notably, a peptide may have more than one pH of optimal stability and solubility. A person having ordinary skill in the art can easily ascertain a given peptide's optimal stability and solubility by referencing literature or by performing assays.

The term "dissolution" as used herein refers to a process by which a material(s) in a gas, solid, or liquid state becomes a solute(s), a dissolved component(s), of a solvent, forming a solution of the gas, liquid, or solid in the solvent. In certain aspects a therapeutic agent (e.g., glucagon or a glucagon analog) or an excipient, e.g., an ionization stabilizing excipient, is present in an amount up to its solubility limited or is fully solubilized. The term "dissolve" refers to a gas, liquid, or solid becoming incorporated into a solvent to form a solution.

The term "excipient" as used herein refers to a natural or synthetic substance formulated alongside the active or therapeutic ingredient (an ingredient that is not the active ingredient) of a medication, included for the purpose of stabilization, bulking, or to confer a therapeutic enhancement on the active ingredient in the final dosage form, such as facilitating drug absorption, reducing viscosity, enhancing solubility, adjusting tonicity, mitigating injection site discomfort, depressing the freezing point, or enhancing stability. Excipients can also be useful in the manufacturing process, to aid in the handling of the active substance concerned such as by facilitating powder flowability or non-stick properties, in addition to aiding in vitro stability such as prevention of denaturation or aggregation over the expected shelf life.

The term "therapeutic agent" encompasses proteins, peptides, and pharmaceutically acceptable salts thereof. Useful salts are known to those skilled in the art and include salts with inorganic acids, organic acids, inorganic bases, or organic bases. Therapeutic agents useful in the present invention are those protein and/or peptide that affect a desired, beneficial, and often pharmacological, effect upon administration to a human or an animal, whether alone or in combination with other pharmaceutical excipients or inert ingredients.

The term "peptide" and "peptide compound" refers to amino acid or amino acid-like (peptidomimetics) polymers of up to about 200 amino acid residues bound together by amide (CONH) or other linkages. In certain aspects a peptide can be up to 150, 100, 80, 60, 40, 20, or 10 amino acids. "Protein" and "protein compound" refer to polymers of greater than 200 amino acid residues bound together by amide linkages. Analogs, derivatives, agonists, antagonists, and pharmaceutically acceptable salts of any of the peptide or protein compounds disclosed here are included in these terms. The terms also include peptides, proteins, peptide compounds, and protein compounds that have D-amino acids, modified, derivatized, or naturally occurring amino acids in the D- or L-configuration and/or peptomimetic units as part of their structure.

"Analogue" and "analog," when referring to a peptide or protein, refers to a modified peptide or protein wherein one or more amino acid residues of the peptide or protein have been substituted by other amino acid residues, or wherein one or more amino acid residues have been deleted from the peptide or protein, or wherein one or more amino acid residues have been added to the peptide or protein, or any combination of such modifications. Such addition, deletion, or substitution of amino acid residues can take place at any point, or multiple points, along the primary structure comprising the peptide, including at the N-terminal of the peptide or protein and/or at the C-terminal of the peptide or protein. "Analogue" or "analog" also includes functional analogs or mimetics/peptomimetics.

"Derivative," in relation to a parent peptide or protein, refers to a chemically modified parent peptide or protein or an analog thereof, wherein at least one substituent is not present in the parent peptide or protein an analog thereof. One such non-limiting example is a parent peptide or protein which has been covalently modified. Typical modifications are amides, carbohydrates, polysaccharides, glycans, alkyl groups, acyl groups, esters, pegylations and the like.

"Single-phase solution" refers to a solution prepared from a therapeutic agent that is dissolved in a solvent, or solvent system (e.g., mixture of two or more solvents), wherein the therapeutic agent is completely dissolved in the solvent and there is no longer particulate matter visible, such that the solution can be described as optically clear. A single-phase solution may also be referred to as a "single-phase system," and is distinguished from a "two-phase system" in that the latter is comprised of particulate matter (e.g., powder) suspended in a fluid.

"Inhibiting" or "reducing" or "ameliorating" or any variation of these terms includes any measurable decrease or complete inhibition to achieve a desired result.

"Ameliorating" or any variation of these terms includes any improvement of benefit to a subject in regard to a targeted condition.

"Effective" or "treating" or "preventing" or any variation of these terms means adequate to accomplish a desired, expected, or intended result.

"Chemical stability," when referring to a therapeutic agent, refers to an acceptable percentage of degradation products produced by chemical pathways such as oxidation and/or hydrolysis and/or fragmentation and/or other chemical degradation pathways. In particular, a formulation is considered chemically stable if no more than about 20% breakdown products are formed after one year of storage at the intended storage temperature of the product (e.g., room temperature); or storage of the product at 25° C. at 60% relative humidity for one year; or storage of the product at 40° C. at 75% relative humidity for one month, and preferably three months. In some embodiments, a chemically stable formulation has less than 20%, less than 15%, less than 10%, less than 5%, less than 4%, less than 3%, less than 2%, or less than 1% breakdown products formed after an extended period of storage at the intended storage temperature of the product.

"Physical stability," when referring to a therapeutic agent, refers to an acceptable percentage of aggregates (e.g., dimers, trimers and larger forms) being formed. In particular, a formulation is considered physically stable if no more that about 15% aggregates are formed after one year of storage at the intended storage temperature of the product (e.g., room temperature); or storage of the product at 25° C. at 60% relative humidity for one year; or storage of the product at 40° C. at 75% relative humidity for one month, and preferably three months. In some embodiments, a physically stable formulation has less than less than 15%, less than 10%, less than 5%, less than 4%, less than 3%, less than 2%, or less than 1% aggregates formed after an extended period of storage at the intended storage temperature of the product.

"Stable formulation" refers to a formulation where at least about 65% of the therapeutic agents (e.g., peptides or salts thereof) remain chemically and physically stable after two months of storage at room temperature. Particularly preferred formulations are those in which at least about 80%, 85%, 90%, 91%, 92%, 93%, 94%, 95%, 96%, 97%, 98%, or 99% chemically and physically stable therapeutic agent remains under these storage conditions. Especially preferred stable formulations are those which do not exhibit degradation after sterilizing irradiation (e.g., gamma, beta, or electron beam).

As used herein, "parenteral administration" refers to administration of a therapeutic agent to a patient via a route other than the alimentary canal—any administration that is not by way of the digestive tract.

As used herein, "parenteral injection" refers to the administration of therapeutic agents (e.g., peptides or small molecules) via injection under or through one or more layers of skin or mucus membranes of an animal, such as a human. Standard parenteral injections are given into the subcutaneous, intramuscular, or intradermal region of an animal or subject, as a human. These deep locations are targeted because the tissue expands more easily relative to shallow dermal sites to accommodate injection volumes required to deliver most therapeutic agents, e.g., 0.1 to 3.0 cc (mL).

The term "intracutaneous" encompasses administration into the epidermal, dermal or subcutaneous skin layer.

As used herein, the term "aprotic polar solvent" refers to a polar solvent which does not contain acidic hydrogen and thus does not act as a hydrogen bond donor. Polar aprotic solvents include, but are not limited to dimethylsulfoxide (DMSO), dimethylformamide (DMF), ethyl acetate, n-methyl pyrrolidone (NMP), dimethylacetamide (DMA), and propylene carbonate.

As used herein, the term "aprotic polar solvent system" refers to a solution wherein the solvent is a single aprotic polar solvent (for example, neat DMSO), or a mixture of two or more aprotic polar solvents (for example, a mixture of DMSO and NMP).

As used herein, "residual moisture" may refer to the residual moisture in the drug powder following preparation by the manufacturer/supplier. Typical powders often have residual moisture contents ranging from up to 10% (w/w). When these powders are dissolved in an aprotic polar solvent system, the residual moisture in the powder is incorporated into the formulation. Additionally, the aprotic polar solvents may also contain a certain level of residual moisture. For example, a freshly opened bottle of USP-grade DMSO typically contains up to 0.1% (w/w) moisture. The residual moisture is different from "added moisture," where water is intentionally added to the formulation, for example to serve as a co-solvent, or to depress the freezing point of the aprotic polar solvent system. Moisture may also be introduced into the formulation during addition of an ionization stabilizing excipient (for example, through addition of a mineral acid from an aqueous stock solution (e.g., 1 N HCl or $H_2SO_4$)). The total moisture content (% w/w, unless otherwise stated) in a formulation immediately following preparation is due to the contributions from both the residual moisture and the added moisture.

The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%. Further, "substantially non-aqueous" refers to less than 5%, 4%, 3%, 2%, 1%, or less by weight or volume of water.

"Pharmaceutically acceptable" ingredient, excipient or component is one that is suitable for use with humans and/or animals without undue adverse side effects (such as toxicity, irritation and allergic response) commensurate with a reasonable benefit/risk ratio.

"Pharmaceutically acceptable carrier" means a pharmaceutically acceptable solvent, suspending agent, or vehicle for delivering a drug compound of the present invention to a mammal such as a human.

As used herein an "ionization stabilizing excipient" is an excipient that establishes and/or maintains a particular ionization state for a therapeutic agent. In certain aspects the ionization stabilizing excipient can be, or includes, a molecule that donates at least one proton under appropriate conditions or is a proton source. According to the Bronsted-Lowry definition, an acid is a molecule that can donate a proton to another molecule, which by accepting the donated proton may thus be classified as a base. As used in this application, and as will be understood by the skilled technician, the term "proton" refers to the hydrogen ion, hydrogen cation, or H+. The hydrogen ion has no electrons and is composed of a nucleus that typically consists solely of a proton (for the most common hydrogen isotope, protium). Specifically, a molecule that can donate at least one proton to the therapeutic agent is considered an acid or proton source, regardless of whether it is completely ionized, mostly ionized, partially ionized, mostly unionized, or completely unionized in the aprotic polar solvent.

As used herein a "mineral acid" is an acid that is derived from one or more inorganic compounds. Accordingly, mineral acids may also be referred to as "inorganic acids." Mineral acids may be monoprotic or polyprotic (e.g., diprotic, triprotic, etc.). Examples of mineral acids include hydrochloric acid (HCl), sulfuric acid ($H_2SO_4$) and phosphoric acid ($H_3PO_4$).

As used herein an "organic acid" is an organic compound with acidic properties (i.e. can function as a proton source). Carboxylic acids are one example of organic acids. Other known examples of organic acids include, but are not limited to, alcohols, thiols, enols, phenols, and sulfonic acids. Organic acids may be monoprotic or polyprotic (e.g. diprotic, triprotic, etc.)

"Charge profile," "charge state," "ionization," "ionization state," and "ionization profile" may be used interchangeably and refer to the ionization state due to protonation and/or deprotonation of the peptide's ionogenic groups.

As used herein, a "co-formulation" is a formulation that contains two or more therapeutic agents dissolved in an aprotic polar solvent system. The therapeutic agents may belong to the same class, or the therapeutic agents may belong to different classes.

An "amphoteric species" is a molecule or ion that can react as an acid as well as a base. These species can either donate or accept a proton. Examples include amino acids, which possess both amine and carboxylic acid functional groups. Amphoteric species further include amphiprotic molecules, which contain at least one hydrogen atom, and have the ability to donate or accept a proton.

The use of the word "a" or "an" when used in conjunction with the term "comprising" in the claims and/or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

The compositions and methods of making and using the same of the present invention can "comprise," "consist essentially of," or "consist of" particular ingredients, components, blends, method steps, etc., disclosed throughout the specification.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

DETAILED DESCRIPTION OF THE INVENTION

Various embodiments utilize glucagon or glucagon analog formulations. These formulations can include, but are not limited to stable glucagon or glucagon analog formulations. Examples of such stable glucagon or glucagon analog formulation are described herein.

In certain aspects, the present invention provides methods of treating exercise associated or exercise induced hypoglycemia by administering to a subject a therapeutic agent in an amount effective to treat, ameliorate, or prevent the condition. In some embodiments, a therapeutic method of the present invention comprises treating hypoglycemia by administering to a subject having hypoglycemia or at risk of developing hypoglycemia a therapeutic agent for hypoglycemia in a stable formulation in an amount effective to treat the hypoglycemia. In some embodiments, the subject is administered a formulation comprising glucagon or a glucagon analog. In certain aspects hypoglycemia can be caused by diabetes or non-diabetes related diseases, conditions, and disorders that effect glycemic regulation when a subject exercises.

A. Treating Exercise Associated Hypoglycemia

In certain aspects, the present invention provides methods of treating exercise associated or exercise induced hypoglycemia by administering to a subject a therapeutic agent in an amount effective to treat, ameliorate, or prevent the condition.

Certain embodiments are directed to methods for preventing or ameliorating exercise associated hypoglycemia using glucagon or a glucagon analog, in particular aspects a mini-dose of glucagon or glucagon analog. In certain aspects a mini-dose is between 25, 50, 75, 100, 125, 150 and 175, 200, 225, 250, 275, 300 μg, including all values and ranges there between. In certain aspects the mini-dose of glucagon is 125 to 175 μg, including 150 μg. In certain aspects glucagon is administered subcutaneously just before exercise in patients with T1D. In certain aspects just before exercise includes 1, 2, 3, 4, 5, 6, 7, 8, 9, 10, 15, 20, 25, 30, 35, 40, 45, 50, 55, 60, 65, 70, 75, 80, to 85 minutes prior to initiation of exercise. Initiation of exercise can include the beginning of activity that results in the increase of the subject's heart rate more than 10, 20, 30, 40, 50% above the resting heart rate. Mini-dose glucagon before exercise can produce better glucose stability than basal insulin reductions or extra carbohydrate consumption. In certain aspects mini-dose glucagon can be administered to ameliorate nocturnal glycemia after exercise. The method can further comprise monitoring or continuous monitoring of blood glucose. In certain aspects an initial or follow on dose of glucagon or glucagon analog can be administered if insulin or glucose levels in a subject's blood fall below a threshold level. In certain aspects, the threshold level is 80, 70, 60, or 50 mg/dL.

As described by the Workgroup of the American Diabetes Association and the Endocrine Society, (Seaquist, et al, (2013), *Diabetes Care*, Vol 36, pages 1384-1395) with respect to hypoglycemia a single threshold value for plasma glucose concentration that defines hypoglycemia in diabetes is not typically assigned because glycemic thresholds for symptoms of hypoglycemia (among other responses) shift to lower plasma glucose concentrations after recent antecedent hypoglycemia and to higher plasma glucose concentrations in patients with poorly controlled diabetes and infrequent hypoglycemia.

Nonetheless, an alert value can be defined that draws the attention of both patients and caregivers to the potential harm associated with hypoglycemia. Patients at risk for hypoglycemia (i.e., those treated with a sulfonylurea, glinide, or insulin) should be alert to the possibility of developing hypoglycemia at a self-monitored plasma glucose—or continuous glucose monitoring subcutaneous glucose—concentration of ≤70 mg/dL (≤3.9 mmol/L). Because it is higher than the glycemic threshold for symptoms in both nondiabetic individuals and those with well-controlled diabetes, it generally allows time to prevent a clinical hypoglycemic episode and provides some margin for the limited accuracy of monitoring devices at low glucose levels.

The condition of severe hypoglycemia is an event requiring assistance of another person to actively administer carbohydrates, glucagon, or take other corrective actions. Plasma glucose concentrations may not be available during an event, but neurological recovery following the return of plasma glucose to normal is considered sufficient evidence that the event was induced by a low plasma glucose concentration. Typically, these events begin occurring at plasma glucose concentrations of ≤50 mg/dL (2.8 mmol/L). Documented symptomatic hypoglycemia is an event during which typical symptoms of hypoglycemia are accompanied by a measured plasma glucose concentration ≤70 mg/dL (≤3.9 mmol/L). Asymptomatic hypoglycemia is an event not accompanied by typical symptoms of hypoglycemia but with a measured plasma glucose concentration ≤70 mg/dL (≤3.9 mmol/L). Probable symptomatic hypoglycemia is an event during which symptoms typical of hypoglycemia are not accompanied by a plasma glucose determination but that was presumably caused by a plasma glucose concentration ≤70 mg/dL (≤≤3.9 mmol/L). Pseudo-hypoglycemia is an event during which the person with diabetes reports any of the typical symptoms of hypoglycemia with a measured plasma glucose concentration >70 mg/dL (>3.9 mmol/L) but approaching that level.

The formulations of the present invention can also be used for the treatment of hyperinsulinemic hypoglycemia, which broadly refers to the condition and effects of low blood glucose levels that are caused by excessive insulin. Hyperinsulinemic hypoglycemia can arise due to endogenous insulin, for example in exercise-induced hypoglycemia. The most common type of severe, but typically transient, hyperinsulinemic hypoglycemia arises from the administration of exogenous insulin in patients with Type 1 diabetes. This type of hypoglycemia can be defined as iatrogenic hypoglycemia, and is a limiting factor in the glycemic management of type 1 and type 2 diabetes. Nocturnal hypoglycemia ("nighttime" hypo) is a common type of iatrogenic hypoglycemia arising in patients taking exogenous insulin.

In some embodiments, a therapeutic method of the present invention comprises treating a subject having diabetes before; during; after; before and during; before and after; or before, during, and after exercise by administering to a subject having diabetes a therapeutic agent in a stable formulation in an amount effective to stabilize or increase glucose levels or glucagon/insulin ratios during and/or after exercise. In some embodiments, the subject is administered a stable formulation comprising glucagon or a glucagon analog.

Determination of an effective amount or dose is well within the capability of those skilled in the art, especially in light of the detailed disclosure provided herein. Generally, the formulations to deliver these doses may contain one or more peptides, or peptide analogs (collectively "peptide," unless peptide analogs are expressly excluded), wherein each peptide is present at a concentration from about 0.1 mg/mL up to the solubility limit of the peptide in the formulation. This concentration is preferably from about 1 mg/mL to about 100 mg/mL. In certain aspects the concentration is about 1 mg/mL, about 5 mg/mL, about 10 mg/mL, about 15 mg/mL, about 20 mg/mL, about 25 mg/mL, about 30 mg/mL, about 35 mg/mL, about 40 mg/mL, about 45 mg/mL, about 50 mg/mL, about 55 mg/mL, about 60 mg/mL, about 65 mg/mL, about 70 mg/mL, about 75 mg/mL, about 80 mg/mL, about 85 mg/mL, about 90 mg/mL, about 95 mg/mL, or about 100 mg/mL.

The formulations of the present invention may be for subcutaneous, intradermal, or intramuscular administration (e.g., by injection or by infusion). In some embodiments, the formulation is administered subcutaneously.

The glucagon or glucagon analog formulations can be administered by infusion or by injection using any suitable device. For example, a glucagon or glucagon analog formulation can be placed into a syringe (e.g., a pre-filled syringe), a pen injection device, an auto-injector device, or a pump device. In some embodiments, the injection device is a multi-dose injector pump device or a multi-dose auto-injector device. The glucagon or glucagon analog formulation can be presented in the device in such a fashion that the formulation is readily able to flow out of the needle upon actuation of an injection device, such as an auto-injector, in order to deliver the peptide drugs. Suitable pen/auto injector devices include, but are not limited to, those pen/auto injection devices manufactured by Becton-Dickenson, Swedish Healthcare Limited (SHL Group), YpsoMed Ag, and the like. Suitable pump devices include, but are not limited to, those pump devices manufactured by Tandem Diabetes Care, Inc., Delsys Pharmaceuticals and the like.

In some embodiments, the glucagon or glucagon analog formulations are provided ready for administration in a vial, a cartridge, or a pre-filled syringe.

Formulations can be administered through oral, parenteral (e.g., intramuscular, intraperitoneal, intravenous or intraarterial, ICV, intracisternal injection or infusion, subcutaneous injection, or implant), inhalation, nasal, vaginal, rectal, sublingual, and/or topical (e.g., transdermal or local) routes of administration, and may be formulated alone or together in suitable dosage unit with a pharmaceutically acceptable vehicle, carrier, diluent, excipient, or a mixture thereof, appropriate for each route of administration.

In certain aspects the glucagon or glucagon analog formulations can be administered parenterally by injection, infusion, or implantation, for local or systemic administration. Parenteral administration, as used herein, include intravenous, intraarterial, intraperitoneal, intrathecal, intraventricular, intraurethral, intrasternal, intracranial, intramuscular, intrasynovial, and subcutaneous administration.

In a further aspect the glucagon or glucagon analog formulations can be administered intranasally or by inhalation to the respiratory tract. The pharmaceutical compositions may be provided in the form of an aerosol or solution for delivery using a pressurized container, pump, spray, atomizer, such as an atomizer using electrohydrodynamics to produce a fine mist, or nebulizer, alone or in combination with a suitable propellant, such as 1,1,1,2-tetrafluoroethane or 1,1,1,2,3,3,3-heptafluoropropane.

In some embodiments, a stable formulation is used for formulating a medicament for the treatment of exercise associated hypoglycemia. In some embodiments, the stable formulation comprises glucagon, a glucagon analog (e.g., dasiglucagon) or a salt thereof (e.g., glucagon acetate). In some embodiments, the stable formulation is used for formulating a medicament for the treatment of diabetic patient prior, during, or after exercise.

Certain aspects of the methods described herein can be implemented using a pump-based system. Pump-based systems used to administer the glucagon or glucagon analog compositions can include closed-loop, open-loop, or no-loop systems. The glucagon or glucagon analog formulations that can be used with such systems are designed to be carried or stored in a pump container without having to be reconstituted (i.e., they are readily available to be administered to the patient/subject from the pump container). Further, the glucagon or glucagon analog formulations can be stable at non-refrigerated temperatures (20-35° C.) for extended periods (>2 months) (i.e., the formulations can be safely stored in the pump container without risking substantial loss in activity of the glucagon in the formulation or risking the formation of insoluble aggregates than will inhibit delivery and clog the infusion apparatus).

The pump-based system can include: (1) a glucose sensor that is or can be inserted in a patient and that is capable of measuring blood glucose levels (e.g., either directly via contact with the patient's blood or indirectly via contact with the patient's interstitial fluid); (2) a transmitter that sends the glucose information from the sensor to a monitor (e.g., via radio frequency transmission); (3) a pump that is designed to store and deliver the glucose or glucagon/glucagon analog formulation to the patient; and/or (4) a monitor (e.g., one that can be built into the pump device or a stand-alone monitor) that displays or records glucose levels. For a closed-loop system, the glucose monitor can be capable of modifying the delivery of the glucagon or glucagon analog formulation to the patient via the pump based upon an algorithm. Such a closed-loop system requires little to no input from the patient and instead actively monitors blood glucose levels and administers the needed amount of the glucagon or glucagon analog formulation to the patient to maintain an appropriate glucose level and prevent the occurrence of hypoglycemia. For an open-loop system, the patient would actively participate by reading their glucose monitor and adjusting the delivery rate/dose based on information provided by the monitor. For a no-loop system, the pump would deliver the glucagon or glucagon analog formulation at a fixed (or basal) dose. The no-loop system can be used without a glucose monitor and without a glucose sensor if so desired.

In certain aspects a glucagon or glucagon analog delivery apparatus can include a reservoir containing a composition comprising glucagon, a glucagon analog, or a salt form of either thereof, a sensor configured to measure a patient's blood glucose level, and an electronic pump configured to intradermally, subcutaneously or intramuscularly deliver at least a portion of the composition to a patient based on the patient's measured blood glucose level. The sensor can be positioned on the patient such that it contacts the patient's blood or contacts the patient's interstitial fluid or both. The sensor can be configured to transmit data (for example, wirelessly, via radio frequency, or via a wired connection) to a processor configured to control operation of the electronic pump. The processor can be configured to control operation of the pump based, at least in part, on the data obtained by the sensor. In one instance, the processor can be configured to control operation of the pump to intradermally, subcutaneously or intramuscularly inject at least a portion of the composition or formulation if the data obtained by the sensor indicates a glucose level below a defined threshold or an indication that a defined threshold will breached in a particular period of time (e.g., an indication of impending hypoglycemia or an indication that the blood glucose levels will fall to below 70, 60, or 50 mg/dL within a certain period of time (e.g., within 30, 25, 20, 15, 10, 9, 8, 7, 6, 5, 4, 3, 2, or 1 minute(s)). Such an indication can be determined by identifying a downward trend of blood glucose levels (e.g., by the blood glucose monitoring device) as well as the speed or trajectory of this downward trend. The glucagon delivery apparatus can also include a monitor configured to communicate information indicative of the patient's glucose level. The monitor can include a speaker or a display device, or both. The monitor can be configured to communicate an alert when a glucose level of the patient is estimated to be at a defined threshold. Still further, the apparatus can be configured to allow manual adjustment of at least one of a delivery rate and a dose of the composition intradermally, subcutaneously or intramuscularly delivered by the pump.

B. Therapeutic Agents

Therapeutic agents in the context of the present invention encompass peptide or protein compounds, small molecule drugs, and pharmaceutically acceptable salts thereof. In certain aspects, when the therapeutic agent is present in the deoxygenated aprotic polar solvent, the stability of the therapeutic agent may be further enhanced when compared with the same therapeutic agent present in an untreated aprotic polar solvent. The increased stability can be attributed due, at least in part, to a reduction in the oxidative degradation of the therapeutic agent or the oxidative degradation of the aprotic polar solvent, or both. One of skill is aware of which therapeutic agent is suitable for treating certain diseases or conditions and would be capable of administering effective amounts of a therapeutic agent in a formulation as described herein for the treatment of a disease or condition.

Non-limiting examples of peptides and proteins (and salts thereof) that can be used in the context of the present invention include, but are not limited to glucagon or analogs thereof.

The therapeutic agent of the invention can be administered intracutaneously in the prevention, diagnosis, alleviation, treatment, or cure of disease. Examples of proteins and proteinaceous compounds which may be formulated and employed in the delivery system according to the present invention include those proteins which have biological activity, or which may be used to treat a disease or other pathological conditions.

Any suitable dosage of peptide or peptides can be formulated. Generally, the peptide (or, in embodiments comprising two or more peptides, each of the peptides) is present in the formulation in an amount ranging from about 0.1 mg/mL to about 100 mg/mL. In some embodiments, the peptide is present in the formulation in an amount ranging from about 5 mg/mL to about 60 mg/mL. In other embodiments, the peptide is present in the formulation in an amount ranging from about 10 mg/mL to about 50 mg/mL. In still other embodiments, the peptide is present in the formulation in an amount ranging from about 1 mg/mL to about 15 mg/mL. In yet other embodiments, the peptide is present in the formulation in an amount ranging from about 0.5 mg/mL to about 5 mg/mL. In yet other embodiments, the peptide is present in the formulation in an amount ranging from about 1 mg/mL to about 50 mg/mL.

In some embodiments, the formulations can further comprise an antioxidant. In other embodiments, the formulations can further comprise a chelator. In still other embodiments, the formulations can further comprise a preservative.

C. Formulations

Formulations that can be used in the methods described herein can include a therapeutic agent present in an aprotic polar solvent system. In certain aspects the aprotic polar solvent system can containing at least one ionization stabilizing excipient. The therapeutic agent can be dissolved (e.g., fully or partially solubilized) or suspended (fully or partially) in the aprotic polar solvent system. Further, a formulation can be structured as a single-phase solution, a paste or slurry, a gel, an emulsion, or a suspension.

In some embodiments, the therapeutic agent is present in an aprotic polar solvent that is "neat," i.e., that does not contain a co-solvent. In other embodiments the therapeutic agent is present in a solvent system that is a mixture of two or more aprotic polar solvents (i.e., an aprotic polar solvent system). An example would be a 75/25 (% v/v) mixture of DMSO and NMP. In some embodiments, however, a co-solvent can be used, where in one or more aprotic polar solvents are mixed with a co-solvent. Non-limiting examples of co-solvents include water, ethanol, propylene glycol (PG), glycerol, and mixtures thereof. In certain aspects water can be specifically excluded or limited as a co-solvent, i.e., the co-solvent can be a non-aqueous co-solvent. The co-solvent may be present in the formulation in an amount ranging from about 0.5% (w/v) to about 50% (w/v), e.g., about 1%, about 5%, about 10%, about 15%, about 20%, about 25%, about 30%, about 35%, or about 40% (w/v). In some embodiments, the co-solvent is present in the formulation in an amount ranging from about 10% (w/v) to about 50% (w/v), from about 10% (w/v) to about 40% (w/v), from about 10% (w/v) to about 30% (w/v), from about 10% (w/v) to about 25% (w/v), from about 15% (w/v) to about 50% (w/v), from about 15% (w/v) to about 40% (w/v), from about 15% (w/v) to about 30% (w/v), or from about 15% (w/v) to about 25% (w/v).

Still further, a glucagon or glucagon analog formulation can include one or more excipients. In some embodiments, the excipient is selected from sugars, starches, sugar alcohols, antioxidants, chelators, and preservatives. Examples of suitable sugars excipients include, but are not limited to trehalose, glucose, sucrose, etc. Examples of suitable starches for stabilizing excipients include, but are not limited to, hydroxyethyl starch (HES). Examples of suitable sugar alcohols (also referred to as polyols) for stabilizing excipients include, but are not limited to, mannitol and sorbitol. Examples of suitable antioxidants include, but are not limited to, ascorbic acid, cysteine, methionine, monothioglycerol, sodium thiosulphate, sulfites, BHT, BHA, ascorbyl palmitate, propyl gallate, N-acetyl-L-cysteine (NAC), and Vitamin E. Examples of suitable chelators include, but are not limited to, EDTA, EDTA disodium salt (edetate disodium), tartaric acid and salts thereof, glycerin, and citric acid and salts thereof. Examples of suitable inorganic salts include sodium chloride, potassium chloride, calcium chloride, magnesium chloride, calcium sulfate, and magnesium sulfate. Examples of suitable preservatives include, but are not limited to, benzyl alcohols, methyl parabens, propyl parabens, and mixtures thereof. Additional formulation components include local anesthetics, such lidocaine or procaine. In some embodiments, an additional stabilizing excipient is present in the formulation in an amount ranging from about 0.05% (w/v) to about 60% (w/v), from about 1% (w/v) to about 50% (w/v), from about 1% (w/v) to about 40% (w/v), from about 1% (w/v) to about 30% (w/v), from about 1% (w/v) to about 20% (w/v), from about 5% (w/v) to about 60% (w/v), from about 5% (w/v) to about 50% (w/v), from about 5% (w/v) to about 40% (w/v), from about 5% (w/v) to about 30% (w/v), from about 5% (w/v) to about 20% (w/v), from about 10% (w/v) to about 60% (w/v), from about 10% (w/v) to about 50% (w/v), from about 10% (w/v) to about 40% (w/v), from about 10% (w/v) to about 30% (w/v), or from about 10% (w/v) to about 20% (w/v). In some embodiments, the additional stabilizing excipient is present in the formulation in an amount that is about, at most, or at least 0.1, 0.5, 1, 2, 3, 4, 5, 6, 7, 8, 9, 10, 15, 20, 25, 30, 35, 40, 45, 50, 55, or 60% (w/v).

D. Kits/Containers

Kits are also contemplated as being used in certain aspects of the present invention. For instance, a glucagon or glucagon analog formulation can be included within a kit. A kit can include a container. In one aspect, for instance, the formulation can be comprised within a container that is ready to administer to a subject without having to reconstitute or dilute the formulation. That is, the formulation to be administered can be stored in the container and be readily used as needed. The container can be a device. The device can be a syringe (e.g. pre-filled syringe), a pen injection device, an auto-injector device, a device that can pump or administer the formulation (e.g., automatic or non-automatic external pumps, implantable pumps, etc.) or a perfusion bag. Suitable pen/auto-injector devices include, but are not limited to, those pen/auto-injection devices manufactured by Becton-Dickenson, Swedish Healthcare Limited (SHL Group), YpsoMed Ag, and the like. Suitable pump devices include, but are not limited to, those pump devices manufactured by Tandem Diabetes Care, Inc., Delsys Pharmaceuticals and the like.

EXAMPLES

The following examples as well as the figures are included to demonstrate preferred embodiments of the invention. It should be appreciated by those of skill in the art that the techniques disclosed in the examples or figures represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Use of Mini-Dose Glucagon to Prevent Exercise-Induced Hypoglycemia in Type 1 Diabetes (T1D)

An example of one study to assess the effectiveness of mini-dose glucagon in the prevention or amelioration of exercise-induced hypoglycemia in type 1 diabetes (T1D) can include a randomized, 4-way crossover trial.

Visit Schedule. (1) Screening/Baseline Visit. This visit will be used to assess eligibility and can include determination of $VO_2$ max for fitness evaluation and for the determination of exercise intensity for the study. (2) Randomized Crossover Trial. Each participant will undergo four aerobic exercise sessions (in random order), with different strategies for glucose regulation that include: (i) Control: Fasted exercise, no basal insulin reduction; (ii) Strategy 1: Fasted exercise, basal insulin reduction only (50% reduction in basal rate five minutes before exercise, for the duration of the exercise); (iii) Strategy 2: Fasted exercise, no basal adjustment+pre-exercise glucose tabs (buccal route-40 grams in total); (iv) Strategy 3: Fasted exercise, no basal adjustment+pre-exercise mini-dose glucagon (sc). In all 4 sessions, aerobic exercise will be performed in the fasted state (before a standardized meal) for 45 minutes at ~50-55% of the participant's predetermined aerobic capacity. The strategies for select sessions will be blinded.

The primary outcome for this study will be the glycemic response during exercise and early recovery. The safety outcomes can include hypoglycemic events or hyperglycemic events. A risk-based monitoring approach will be followed, consistent with the FDA "Guidance for Industry Oversight of Clinical Investigations—A Risk-Based Approach to Monitoring" (August 2013).

Study Population. The crossover trial will include participants who complete the study. Participants may be replaced if a participant does not complete the entire protocol. To be eligible for the study, a participant must meet the inclusion criteria and meet none of the exclusion criteria. Inclusion criteria can include (1) Clinical diagnosis of presumed autoimmune type 1 diabetes, receiving daily insulin; (2) Age 18-65 years; (3) Duration of T1D ≥2 years; (4) Random C-peptide <0.6 ng/ml; (5) Using CSII (e.g., insulin pump) for at least 6 months, with no plans to discontinue pump use during the study; (6) Exercises regularly, i.e., 30 minutes moderate or more vigorous aerobic activity X≥3 times/week; (7) Body mass index (BMI)<30 kg/m$^2$; (8) Females must meet one of the following criteria: (a) Of childbearing potential and not currently pregnant or lactating, and agrees to use an accepted contraceptive regimen as described in the study procedure manual throughout the entire duration of the study; or (b) Of non-childbearing potential, defined as a female who has had a hysterectomy or tubal ligation, is clinically considered infertile or is in a menopausal state (at least 1 year without menses); (9) In good general health with no conditions that could influence the outcome of the trial, and in the judgment of the investigator is a good candidate for the study based on review of available medical history, physical examination and clinical laboratory evaluations; (10) Willing to adhere to the protocol requirements for the duration of the study; (11) Must be enrolled in the T1D Exchange clinic registry or willing to join the registry.

Exclusion criteria can include (1) One or more severe hypoglycemic episodes in the past 12 months (as defined by an episode that required third party assistance for treatment); (2) Active diabetic retinopathy (PDR or VH in past 6 months) that could potentially be worsened by exercise protocol; (3) Peripheral neuropathy with insensate feet; (4) Cardiovascular autonomic neuropathy with inappropriate heart rate response to exercise (could be diagnosed with screening EKG: rule out tachycardia with fixed RR interval); (5) Use of non-insulin anti-diabetic medications; (6) Use of beta-blockers; (7) Use of agents that affect hepatic glucose production such as beta adrenergic agonists or xanthine derivatives; (8) Use of Pramlintide; (9) Currently following a very low calorie or other weight-loss diet; (10) Participation in other studies involving administration of an investigational drug or device within 30 days or 5 half-lives, whichever is longer, before screening for the current study or planning to participate in another such study during participation in the currently described study.

Screening Visit and Patient Enrollment. Potential participants will have a screening visit to assess eligibility through the elicitation of a medical history and performance of a physical examination by a study investigator. Screening labs will be collected. A urine pregnancy test will be done for females with child-bearing potential. Clinical sites will keep a record of the reason why screened participants are not enrolled.

The following laboratory testing results, typically obtained as part of routine care, will be assessed by the investigator as part of the general assessment for eligibility. Time periods prior to enrollment for which each test should have been performed are given in parenthesis: Basic Metabolic Panel (within 3 months); Complete Blood Count (within 3 months); Liver Function Panel (within 6 months); Random C-peptide (since diagnosis, subjects must be <0.6 ng/ml); Lipids (within 6 months); Thyroid-Stimulating Hormone (within 12 months); HbA1c will be measured using point-of-care device or local lab if not available within the 3 months prior to enrollment; Urine pregnancy test if indicated (see inclusion criteria).

A history will be elicited from the participant and extracted from available medical records with regard to the participant's diabetes history, current diabetes management, other past and current medical problems, past and current medications, drug allergies, and family history. A standard physical exam (including vital signs and height and weight measurements) will be performed by the study investigator or his or her designee (an endocrinologist, endocrine fellow, endocrine nurse practitioner or a physician assistant).

The study will be discussed with potential participants. A copy of the consent form will be provided to the participant and another copy will be added to the participant's clinic chart. Written informed consent will be obtained prior to performing any study-specific procedures that are not part of the participant's routine care. As part of the informed consent process, each participant will be asked to sign an authorization for release of personal information. The investigator, or his or her designee, will review what study specific information will be collected and to whom that information will be disclosed. After speaking with the participant, questions will be answered about the details regarding authorization.

A. Study Protocol

Procedures Prior to First Exercise Session. Prior the first exercise session a subject's $VO_2$ max will be assed following the Bruce protocol and basal insulin dose will be determined as per investigator's usual routine.

Exercise Sessions. Each participant will be assigned to a sequence of control trial, strategy 1, strategy 2, and strategy 3 through a randomization process. Each exercise session will be separated by at least 3 days and participants will be expected to complete all sessions within 12 weeks from the time of the baseline/screening visit. Participants will be advised to avoid any vigorous exercise within 24 hours before or after the laboratory-based exercise tests. Subjects will be asked about activity to monitor adherence to these recommendations.

The day before each exercise session participants will: Insert new insulin infusion set into abdomen or upper buttock (ensure not in exercising limb); For CGM users, insert a new CGM sensor; For non-CGM users, come into clinic to have a CGM sensor inserted to use with a blinded receiver.

The participant will be contacted by the research staff on the evening before and the morning of each exercise session to review glucose levels and help mitigate pre-exercise hyperglycemia or hypoglycemia. If at the time of the morning call, the glucose concentration is below target (<100 mg/dL), then supplemental fast-acting carbohydrate will be taken. If above target (>140 mg/dL), then a conservative correction bolus will be recommended (based on insulin sensitivity factor).

The participant will arrive at the facility in a fasted state (minimum of 8 hour fast). Blood glucose concentration will be checked upon arrival. Oral glucose or IV glucose may be given to bring participant into range before exercise. Females will have a urine pregnancy test performed prior to each exercise session (if applicable).

Before an exercise session can begin: (1) Participant glucose must be 100-140 mg/dL (venous, plasma); (2) Last insulin bolus (mealtime or correction) should be ≥3 hours previously.

During Exercise Sessions. At each visit, participants will complete one of the following four exercise sessions (sequence of sessions determined by randomization):

Control Trial: No basal insulin adjustment, no carbohydrate intake until glucose drops <70 mg/dL. Then 20 grams of dextrose will be given orally.

Strategy 1: Basal insulin reduction to 50% five minutes before the start of exercise. Basal insulin rate will be returned to usual rate 45 minutes after the start of exercise.

Strategy 2: Dextrose tabs taken orally (20 grams) five minutes before the start of exercise and at 30 minutes of exercise (total 40 grams).

Strategy 3: Glucagon (150 µg) five minutes before the start of exercise (SQ-abdomen). The dose for strategy 3 will likely be 150 µg, but may be modified to be lower or higher, with a possible range of 75-300 µg. One or more pilot phases can be conducted prior to study initiation to determine the most appropriate dose.

The participant's pump will be blinded during the control trial, strategy 1, and strategy 3 and an injection of saline will be given during the control trial and strategy 1 so that participant is blinded to strategy.

Exercise will consist of moderate intensity aerobic activity (treadmill jogging/brisk walking) performed at 50-55% of predetermined $VO_2$ max for 45 minutes. Continuous heart rate measurements will be conducted along with intermittent ratings of perceived exertion (Borg 6-20 scale).

Exercise will be terminated if: (i) Glucose is <70 mg/dL; participants will be treated for hypoglycemia (initially 20 grams of oral dextrose tabs or IV dextrose or IM glucagon depending on the severity of the hypoglycemia); or (ii) Participants experience dizziness, pallor and other symptoms of poor perfusion and or exercise intolerance. Any treatment given will be recorded. Participants who are not able to complete an exercise session due to termination will still complete remaining study procedures.

Following each exercise session, the participant will rest for 30 minutes and then consume a standardized meal containing 44-50 grams of carbohydrate that constitute ~55% of calories, together with ~20% calories from protein and ~25% calories from fat. The amount of bolus insulin given will be based on the carbohydrate content of the meal and the patient's own individualized insulin to carbohydrate ratio. Insulin will be administered five minutes before the standardized meal. In the first phase of the experiments, insulin "corrections" will not be given unless subjects have post exercise/pre meal hyperglycemia ≥270 mg/dl. If hypoglycemia occurs prior to the meal, subjects will be treated with 20 grams of fast-acting carbohydrate prior to meal consumption.

The participant will be monitored for at least 2 hours after the meal prior to discharge. Participants will be given a meal log and another standardized meal to take with them at discharge. Participants will be instructed to eat the standardized meal for their next meal and log the time it was eaten. They will also be asked to log any meals they consume through noon the following day.

For participants using the blinded CGM, the sensor will be removed at 12:00 PM the next day at home (~24 hours after the end of exercise). The participant will bring the device to the next visit or mail it back to the clinic. Participants will receive a phone call the day after each exercise session to elicit any adverse events. For CGM users, the CGM data will be downloaded at each visit and arrangements made to transmit the data following the last exercise session. The participant's insulin pump will be downloaded at each visit and arrangements made to transmit the data following the last exercise session.

Sample collection. Blood samples collected through a venous catheter with plasma glucose measured by an YSI analyzer. Blood samples will be collected at: Baseline (at −30, −15, −5, 0 min), During exercise (at 5, 10, 15, 25, 35, 45 min), In recovery post exercise (at 50, 55, 60, 75 min), Regularly following a standardized mixed meal for 90 minutes (at 90, 105, 120, 135, and 165 min). Plasma from the collected blood samples will be used to measure the following hormones, proinflammatory markers and metabolites at baseline, during exercise, in recovery post exercise, and regularly following the standardized mixed meal: Insulin, Glucagon, Cortisol, Growth hormone, Catecholamines (epinephrine and norepinephrine), Interleukin-6, tumor necrosis factor-α, Nonesterified fatty acids, β-hydroxybutyrate, and/or Lactate.

B. Results

This study aimed to determine if the administration of mini-dose glucagon (MDG) just before exercise produces better glucose stability than (1) basal reduction, (2) pretreatment with glucose tabs, and (3) a control without either, for moderate intensity exercise in patients with T1D Subjects aged 18-<65 years with a duration of T1D ≥2 years, a random C-peptide <0.6 ng/ml, that use CSII (Insulin pump) for at least 6 months, with no plans to discontinue pump use during the study and exercise regularly, ≥30 minutes moderate or more vigorous aerobic activity X≥3 times/week were randomized in a 4-period crossover trial. The control was no basal insulin adjustment, no carbs unless glucose <70 mg/dL (then 20 g dextrose given).

Basal Rate Reduction: Basal rate decreased by 50% 5 minutes before start of exercise (basal rate returned to usual rate at end of exercise).

Glucose Tabs: Dextrose tabs orally (20 grams) 5 min before start of exercise and 20 grams again at 30 min after start.

Mini-Dose Glucagon: Glucagon (150 μg) 5 min before start of exercise (SQ-abdomen).

Exercise consisted of moderate intensity aerobic activity (treadmill brisk uphill walking) performed at 50-55% $VO_2$ max for 45 min. Performed in fasted state. Same workload performed at each exercise session. Exercise was terminated if: glucose <70 mg/dL (participant treated for hypo) and/or participant experienced dizziness, pallor and other symptoms of poor perfusion and/or exercise intolerance.

Following each exercise session, participants rested for 30 min and then consumed a standardized meal. Meal contained 44-50 grams of carbohydrate (55% of calories from carbohydrate, 20% from protein, and 25% from fat). Insulin is administered as pump bolus 5 min before standardized meal using participants own carbohydrate ratio with correction only if glucose ≥270 mg/dL.

Figure 1:
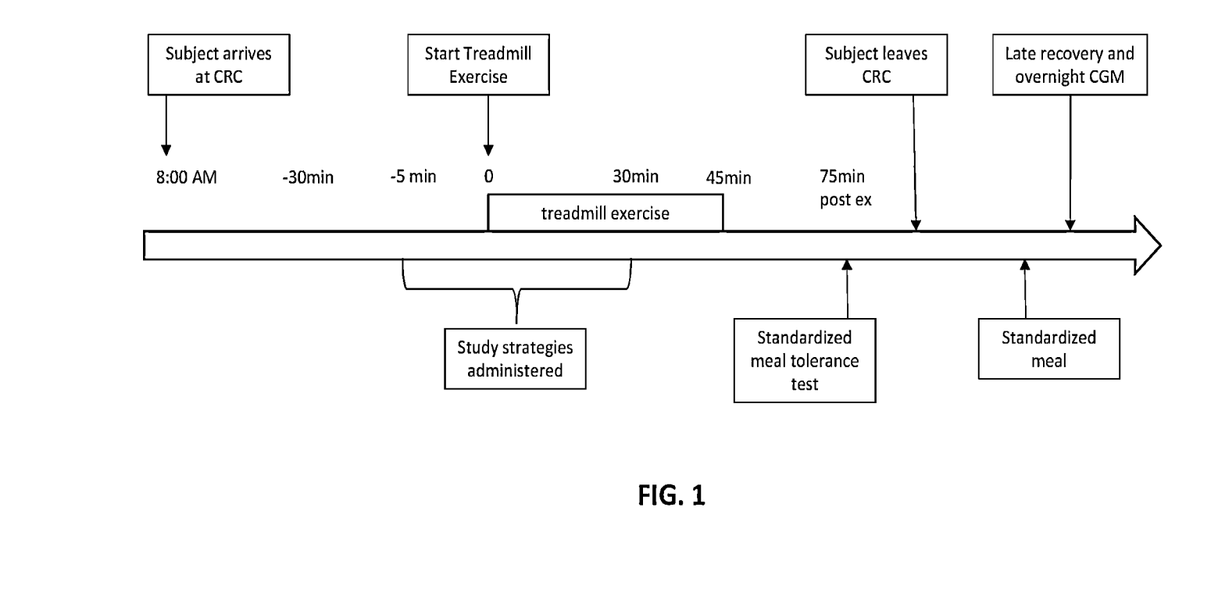
FIG. 1. Diagram of a representative study protocol, as discussed in Example 1.
Figure 2A:
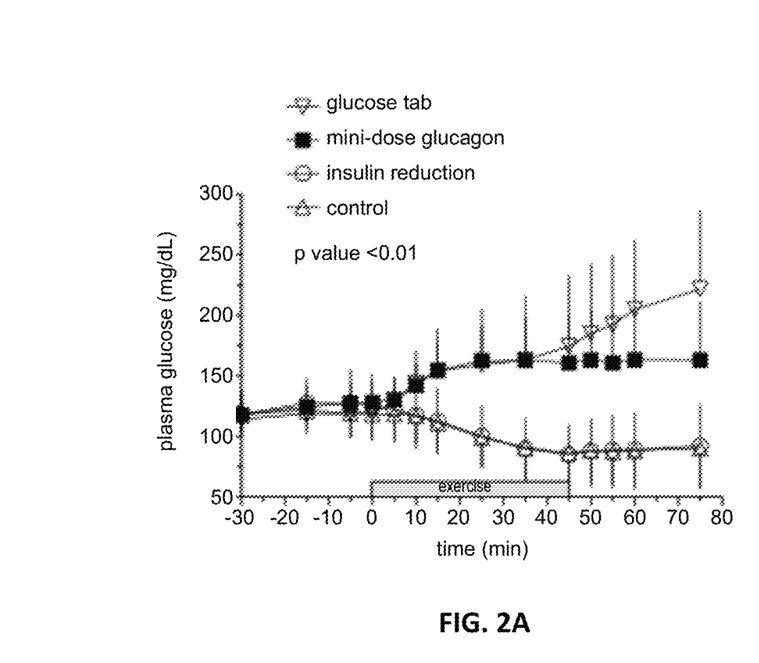
FIGS. 2A-2B. Plasma Glucose Levels by YSI Analyzer in Patients During Exercise (FIG. 2A)/Early Recovery and Post Meal (FIG. 2B), as discussed in Example 1.
Figure 2B:
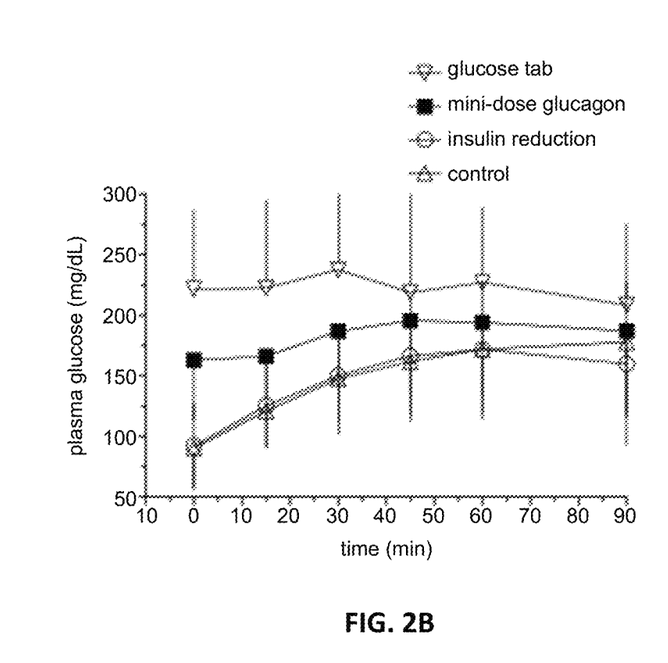
Figure 3:
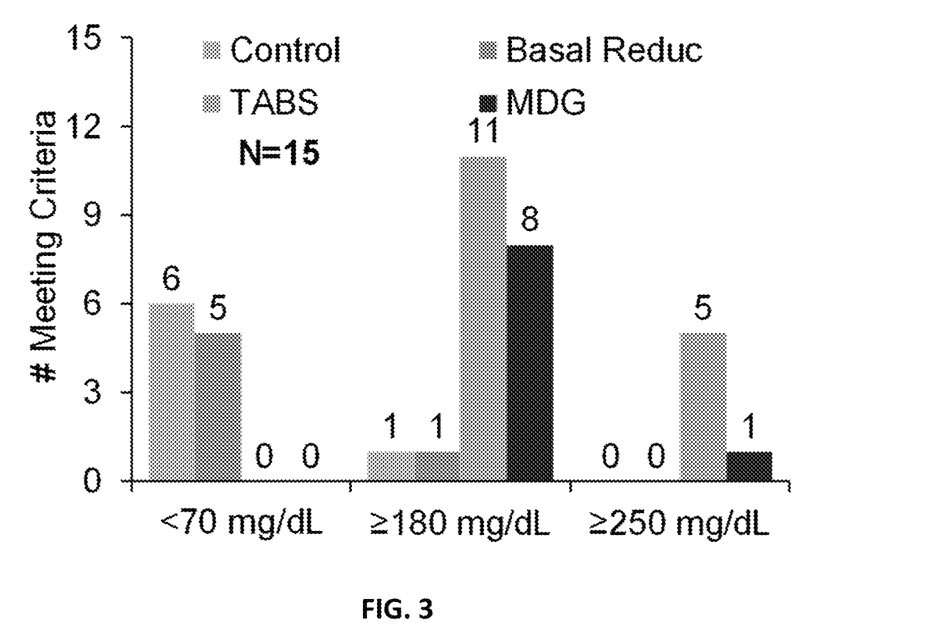
FIG. 3. Number of Patients with Hypo- and Hyperglycemia during Exercise/Early Recovery, as discussed in Example 1. TABS=patients taking glucose tablets; Basal Reduc=patients with reduction in basal insulin; and MDG=mini-dose glucagon.
Figure 4A:
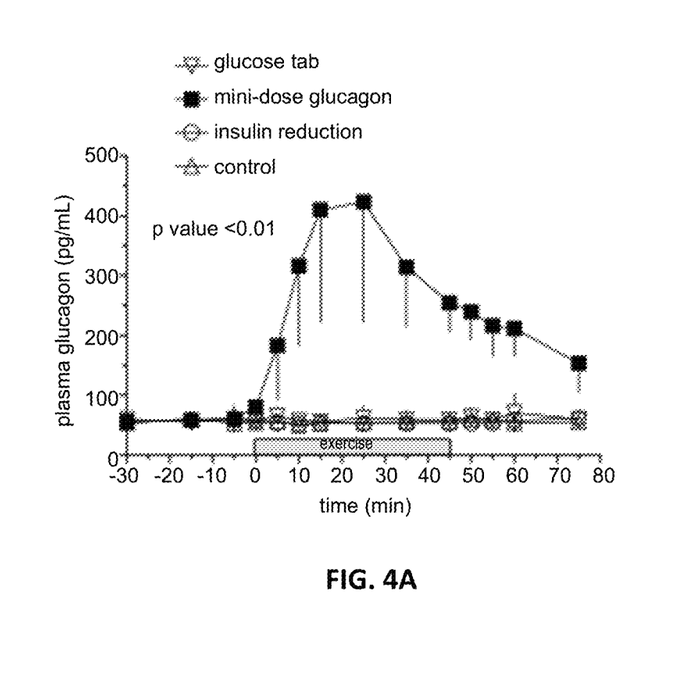
FIGS. 4A-4B. Plasma Glucagon Levels in Patients During Exercise (FIG. 4A)/Early Recovery and Post Meal (FIG. 4B), as discussed in Example 1.
Figure 4B:
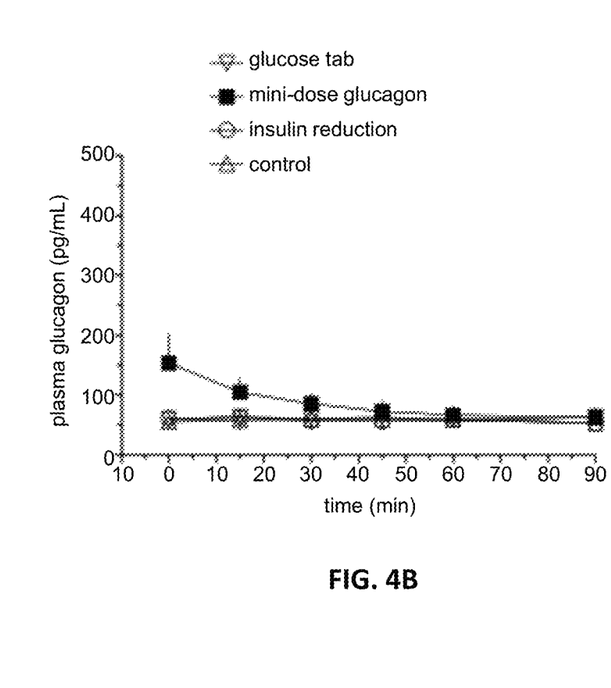
Figure 5:
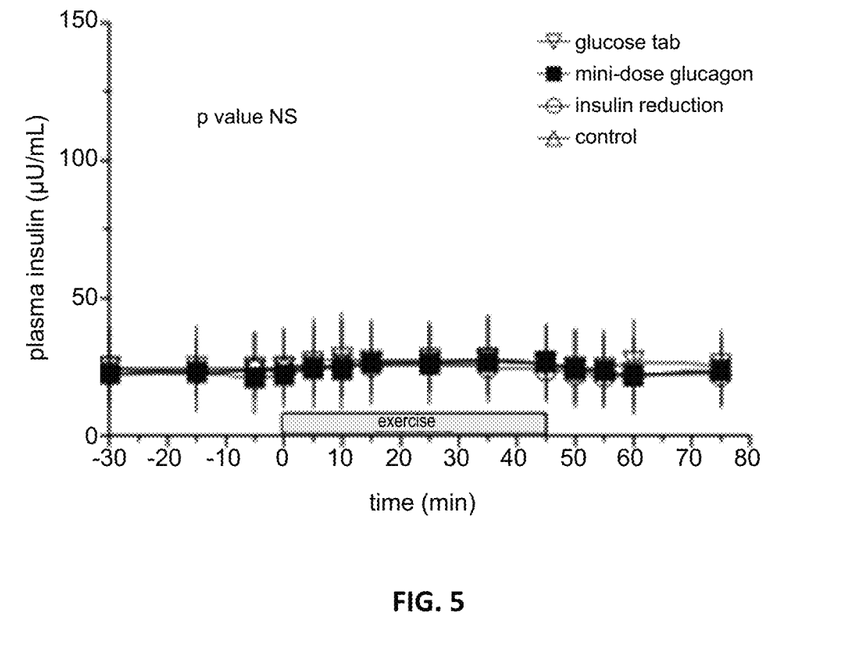
FIG. 5. Plasma Insulin Levels in Patients During Exercise/Early Recovery, as discussed in Example 1.
Figure 6:
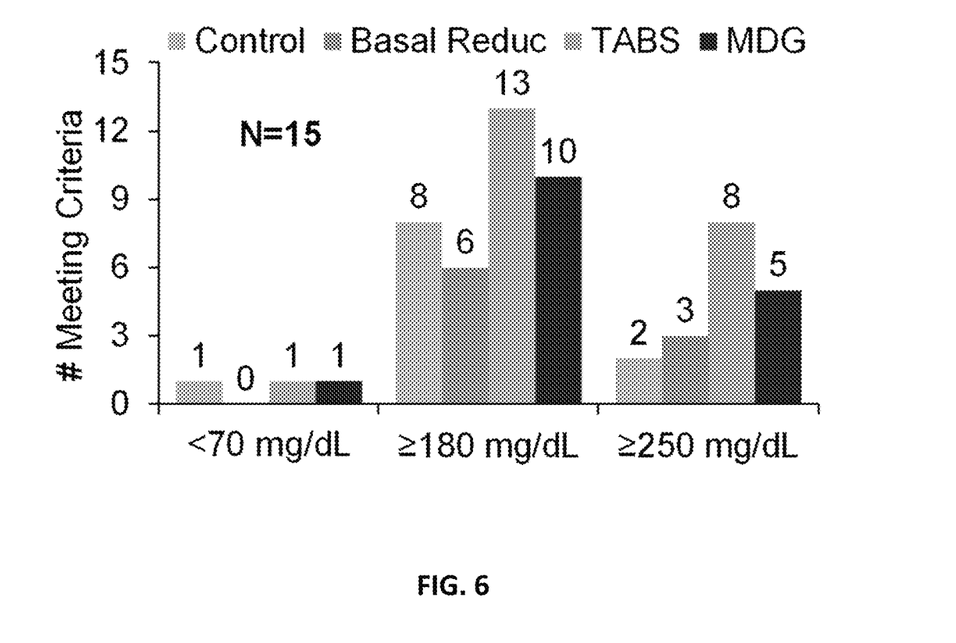
FIG. 6. Number of Patients with Hypo- and Hyperglycemia Post Meal, as discussed in Example 1. TABS=patients taking glucose tablets; Basal Reduc=patients with reduction in basal insulin; and MDG=mini-dose glucagon.

FIG. 2 to FIG. 6 show the results obtained in one such study. The result show that MDG given just before aerobic exercise reduces the frequency of a drop in glucose concentration in people with type 1 diabetes. Reducing basal insulin at exercise start time was not effective in limiting the drop in glycemia during aerobic exercise. Increased carbohydrate intake (40 g/hr) for exercise increased hyperglycemia during the activity and exaggerated glucose excursions at the meal following exercise. MDG was more effective than insulin reduction for reducing exercise-induced hypoglycemia, and resulted in less post-intervention hyperglycemia than ingestion of carbohydrate. MDG provides an effective new strategy for the reduction of exercise-induced hypoglycemia and post-exercise hyperglycemia.

TABLE 1

CGM Metrics Late Recovery Period*

| | Control n = 14 | Basal Reduc n = 13 | TABS n = 13 | MDG n = 14 |
|---|---|---|---|---|
| Nadir Glucose, mg/dL-median | 45 | 44 | 49 | 51 |
| Mean Glucose, mg/dL-median | 129 | 138 | 134 | 150 |
| % of time <70 mg/dl-mean | 11% | 8% | 8% | 7% |
| % of time 70-180 mg/dL-mean | 73% | 71% | 67% | 66% |
| Coefficient of Variation-median | 32% | 34% | 39% | 34% |

*Standard meal to noon the day after exercise session; no statistically significant differences found for above metrics

TABLE 2

| | Control n = 13 | Basal Reduc n = 13 | TABS n = 11 | MDG n = 13 |
|---|---|---|---|---|
| Nadir Glucose, mg/dL-median | 102 | 93 | 77 | 91 |
| Mean Glucose, mg/dl-median | 132 | 137 | 128 | 156 |
| Occurrence of Hypoglycemia (<70 mg/dL)-% | 23% | 23% | 27% | 23% |
| % of time <70 mg/dl-mean | 5% | 4% | 3% | 4% |
| % of time 70-180 mg/dl-mean | 77% | 66% | 63% | 59% |
| Coefficient of Variation-median | 15% | 13% | 15% | 21% |

*Midnight to 6 am the day after exercise session; no statistically significant differences found for above metrics

The invention claimed is:

1. A method for treating exercise-induced hypoglycemia in a subject comprising administering a composition comprising glucagon, a glucagon analog, or salt thereof 5 to 30 minutes prior to initiation of exercise; wherein said composition is a single-phase solution comprising glucagon, a glucagon analog, or salt thereof, dissolved in an aprotic polar solvent.

2. The method of claim 1, wherein the subject is a diabetic subject.

3. The method of claim 2, wherein the diabetic subject uses exogenous insulin.

4. The method of claim 1, wherein the composition comprises 50 to 300 µg of glucagon, glucagon analog, or salt thereof.

5. The method of claim 4, wherein the composition comprises 150 µg of glucagon, glucagon analog, or salt thereof.

6. The method of claim 1, wherein the composition is administered as a bolus.

7. The method of claim 1, wherein the composition is administered as an infusion over 5 to 45 minutes.

8. The method of claim 1, wherein the composition is administered from a delivery apparatus, wherein the apparatus comprises: (i) a reservoir containing the glucagon, glucagon analog, or salt thereof composition; and (ii) an electronic pump configured to intradermally, subcutaneously, or intramuscularly deliver at least a portion of the composition to a subject.

9. The method of claim 8, wherein the delivery apparatus is a closed-loop, open-loop, or no loop system for delivering the composition to the subject.

10. The method of claim 1, wherein the aprotic polar solvent is DMSO.

11. The method of claim 1, wherein the aprotic polar solvent is a deoxygenated aprotic polar solvent.

12. The method of claim 1, wherein the composition further comprises an ionization stabilizing excipient, wherein (i) the glucagon, glucagon analog, or salt thereof is dissolved in the aprotic polar solvent in an amount from about 0.1 mg/mL up to the solubility limit of the glucagon, glucagon analog, or salt thereof; and (ii) the ionization stabilizing excipient is dissolved in the aprotic polar solvent in an amount sufficient to stabilize the ionization of the glucagon, glucagon analog, or salt thereof.

13. The method of claim 12, wherein the ionization stabilizing excipient is at a concentration of 0.1 mM to 100 mM.

14. The method of claim 12, wherein the ionization stabilizing excipient is a mineral acid.

15. The method of claim 14, wherein the mineral acid is sulfuric acid.

16. The method of claim 14, wherein the composition further comprises one or more sugars or starches.

17. The method of claim 16, wherein the sugar is trehalose, glucose, or sucrose.

18. The method of claim 16, wherein the composition comprises at least 80 wt. % of the aprotic polar solvent, 3 to 7 wt. % of the sugar or starch, 0.001 to 0.1 wt. % of an amphoteric molecule, and 0 wt. % to less than 0.1 wt. % of the mineral acid.

19. The method of claim 12, wherein the ionization stabilizing excipient is sulfuric acid and the aprotic polar solvent is DMSO.

20. The method of claim 12, wherein the composition has a moisture content of less than 10%, 5%, or 3%.

21. The method of claim 12, wherein the composition further comprises a preservative at less than 10%, 5%, or 3% w/v.

22. The method of claim 21, wherein the preservative is benzyl alcohol, methyl parabens, propyl parabens, or mixtures thereof.

23. The method of claim 12, wherein the composition further comprises a sugar alcohol at less than 10%, 5%, or 3% w/v.

24. The method of claim 23, wherein the sugar alcohol is mannitol or sorbitol.

25. The method of claim 1, wherein the composition has a water content of less than 15 wt. %, less than 3 wt. %, 3 to 10 wt. %, or 5 to 8 wt. %.

26. The method of claim 1, wherein the glucagon, glucagon analog, or salt thereof, has (i) been previously dried from a buffer; (ii) has a first ionization profile that corresponds to an optimal stability and solubility for the glucagon, glucagon analog, or salt thereof; (iii) is reconstituted into the aprotic polar solvent; and (iv) has a second ionization profile in the aprotic polar solvent, wherein the first and second ionization profiles are within 1 pH unit of one another.

27. The method of claim 1, wherein the composition has been stored in the reservoir for at least 1, 2, 3, 4, 5, 6, 7, 14, 21, 30, 45, or 60 days.

* * * * *